United States Patent [19]

Walker et al.

[11] Patent Number: 5,420,959
[45] Date of Patent: May 30, 1995

[54] HIGH EFFICIENCY, HIGH RESOLUTION, REAL-TIME RADIOGRAPHIC IMAGING SYSTEM

[75] Inventors: James K. Walker; Jacob R. Tymianski, both of Gainesville, Fla.

[73] Assignee: Nanoptics Incorporated, Gainesville, Fla.

[21] Appl. No.: 149,750

[22] Filed: Nov. 17, 1993

Related U.S. Application Data

[63] Continuation-in-part of Ser. No. 992,140, Dec. 17, 1992, Pat. No. 5,308,986.

[51] Int. Cl.$^6$ ............................................. G02B 5/172
[52] U.S. Cl. ..................................... 385/143; 250/368; 385/145
[58] Field of Search ................ 385/141, 142, 143, 145, 385/147; 250/368, 367, 370.11

[56] References Cited

U.S. PATENT DOCUMENTS

| | | | |
|---|---|---|---|
| 3,041,287 | 6/1962 | Hyman | 252/301.2 |
| 4,096,381 | 6/1978 | Brown, Sr. | 250/213 R |
| 4,415,810 | 11/1983 | Brown, Sr. | 250/484.1 |
| 4,495,084 | 1/1985 | Shimizu et al. | 252/301.17 |
| 4,552,431 | 11/1985 | Allemand et al. | 350/96.34 |
| 4,713,198 | 12/1987 | Simonetti | 252/301.17 |
| 4,779,954 | 10/1988 | Tatsukami et al. | 385/143 |
| 4,788,436 | 11/1988 | Koechner | 250/485.1 |
| 5,110,500 | 5/1992 | Walker | 252/301.16 |
| 5,155,366 | 10/1992 | Miller | 250/368 |
| 5,168,540 | 12/1992 | Winn et al. | 385/128 |
| 5,298,189 | 3/1994 | Kauffman | 252/301.17 |
| 5,308,986 | 5/1994 | Walker | 250/370.11 |

FOREIGN PATENT DOCUMENTS

| | | | |
|---|---|---|---|
| 0107532 | 5/1984 | European Pat. Off. | G02B 5/16 |
| 0358413 | 3/1990 | European Pat. Off. | G01T 1/203 |
| 58-92979 | 6/1983 | Japan | 250/368 |
| 63-238584 | 10/1988 | Japan | 250/368 |
| 01-253682 | 10/1989 | Japan | 250/368 |

OTHER PUBLICATIONS

W. R. Binns, J. J. Connell, P. F. Dowknott, J. W. Epstein, M. H. Israel & J. Klarmann, "A Scintillation Optical Fiber Track Imaging Detector", Nuclear Instruments and Methods in Physics Research, vol. A251, (1986), pp. 402–406.

IEEE Transactions on Nuclear Science, vol. 38, No. 2, Apr. 1991, pp. 845–857; Shao et al., "Scintillating Fiber Optics and their Application in Radiographic Systems".

Materials Evaluation, vol. 49, No. 11, Nov. 1991, pp. 1419–1421; Placious et al., "High Density Glass Scintilator for Real-Time X-ray Inspection".

Application Radiation Isotopes, vol. 41, No. 9, pp. 809–815, 1990; Int. J. Radiat. Appl. Instrum., Part A; Wunderly et al., "New Quench-Resistant Fluors for Liquid Scintillation Counting".

TEFLON AF Amorphous Fluoropolymer—Product Bulletin H–16577–1, Dec. 1989, Dupont Company, "A (List continued on next page.)

Primary Examiner—Akm E. Ullah
Attorney, Agent, or Firm—Breneman, Georges & Krikelis

[57] ABSTRACT

A new scintillating optical fiber is used in an array as a scintillator plate for imaging with high energy radiation, particles and the like. The scintillating optical fiber has an inner plastic core fiber which is transparent to visible radiation and has an index of refraction of about 1.45 or greater. The inner plastic core fiber has a plastic cladding material which has an index of refraction less than that of the inner plastic core fiber. The inner plastic core fiber contains a polymeric matrix material; a metal moiety; and an organic fluorescent material. The scintillator plates are useful in producing high efficiency and high resolution radiographic systems for x-ray medical diagnosis or non-destructive inspection as well as non-destructive inspection with thermal neutrons. In medical x-ray applications, such as mammography, the need for lower doses of x-rays for a given image quality is met and exceeded by the higher detection efficiency of the scintillator plates and their associated electronic read-out system.

40 Claims, 2 Drawing Sheets

OTHER PUBLICATIONS

"New Generation of Teflon Fluorocarbon Resins for High Performance".

Applied Optics, vol. 24, No. 7, Apr. 1, 1985, pp. 994–997; Bigler et al., "Scintillating Optical Fiber Array for High-Resolution X-ray Imaging Over 5 KEV".

The Theory and Practice of Scintillation Counting by Birks; A Pergamon Press Book; MacMillan Co., N.Y., Section 9.7, "Loading With Heavy Elements", pp. 339 & 340, References 351–353, (no date).

Industrial Quality Inc., Product Bulletin, 1991, "High Density Glass Scintillator for X-ray Imaging Type 101–301".

Industrial Quality Inc., Product Bulletin, 1991 "High Density Glass Fiber-Optic Scintillator (FOS) for X-ray Imaging".

Fig. 2
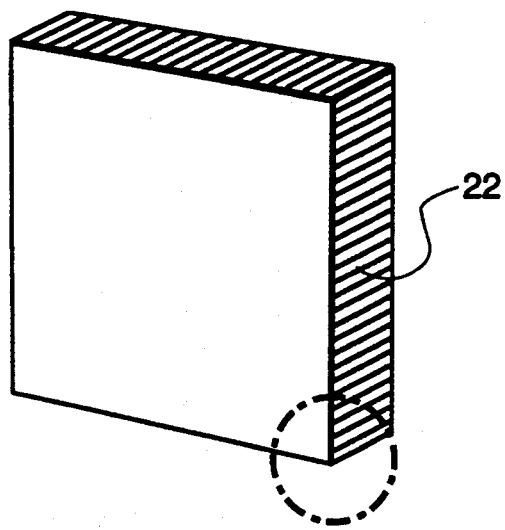
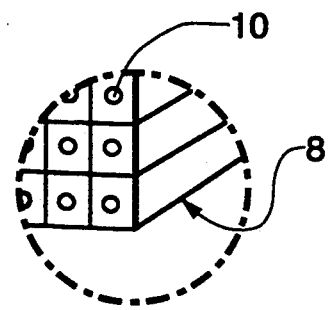
Fig. 2A
Fig. 3
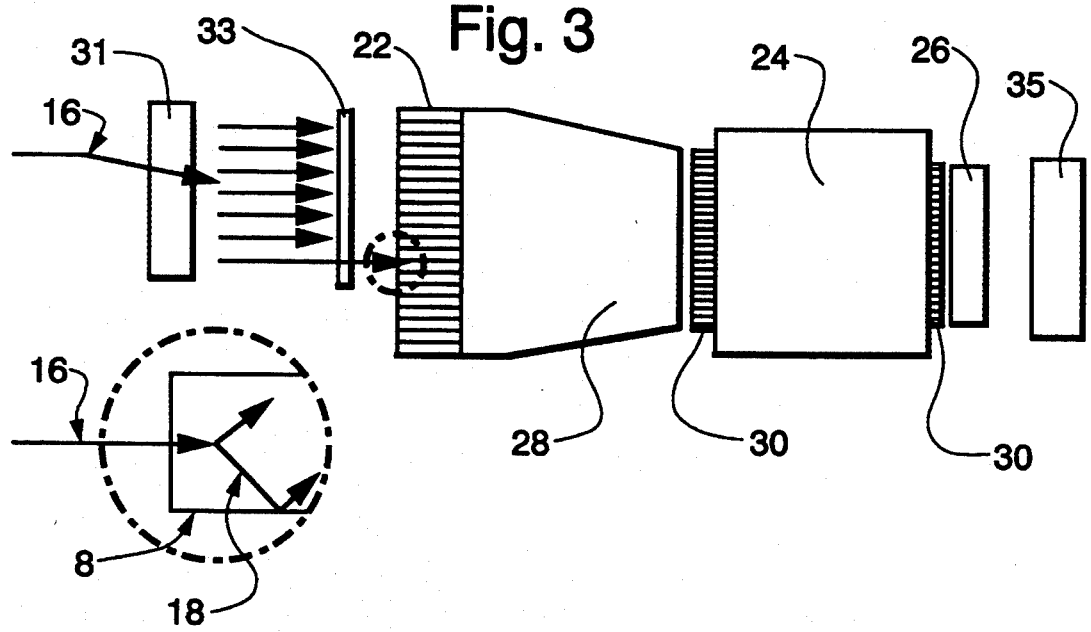
Fig. 3A

HIGH EFFICIENCY, HIGH RESOLUTION, REAL-TIME RADIOGRAPHIC IMAGING SYSTEM

Research leading to completion of the invention was supported by Contract No. 50-DKNA-1-00096 issued by the Department of Commerce. The United States Government has certain rights to the invention described herein.

CROSS REFERENCES TO RELATED APPLICATIONS

This is a continuation-in-part of U.S. Ser. No. 07/992,140, filed Dec. 17, 1992, now U.S. Pat. No. 5,308,986.

BACKGROUND OF THE INVENTION

1. Field of the Invention

This invention relates to optical fiber scintillators for use in detecting x-rays, γ-rays, thermal neutrons, and the like. More particularly, this invention relates to improved, high efficiency, high spatial resolution optical fiber arrays for use as scintillator plates in radiographic imaging systems and particularly real-time imaging systems.

2. Description of Related Art

Conventional radiographic imaging systems which are used medically for diagnosis and industrially for inspection, typically contain a detector which is a combination of an inorganic phosphor screen with a photographic film or with an image intensifier, photo-electric detector. When it is necessary to view the image instantaneously, i.e., in real-time, the image intensifier, photo-electric detector is used in combination with suitable monitor system. Such inorganic phosphor screens which are used extensively for high energy photon imaging suffer from the compromise between detection efficiency and spatial resolution. This compromise is the consequence of the low interaction probability of the high energy photon within the phosphor screen thickness to produce scintillation light. When the interaction probability is increased by increasing the thickness of the screen, spatial resolution of the incident high energy photons suffers since the isotropically produced scintillation light is spread over a larger area. Loss in spatial resolution is further exacerbated by light scatter due to the granularity of such thick phosphor screens. Thus, screens are manufactured to be as thin as possible without unduly limiting sensitivity.

In an attempt to overcome the inherent limitations of conventional phosphor screens, fiber optic scintillator plates have been devised for real time imaging systems. Such a plate is described in Brown, U.S. Pat. No. 4,415,810 and in the publication "High-Density Glass Scintillator for Real-Time X-Ray Inspection" by Placious et al. in MATERIALS EVALUATION, Vol. 49, No. 11, pp. 1419-21, November, 1991. Brown discloses a device for imaging penetrating radiation which includes a multiplicity of contiguously disposed fiberoptic tubes each of which is made of a very small diameter with an inner core material composed of scintillating material and a cladding glass about the inner core to serve as a reflector and a third and outer layer which is light absorbing to absorb stray light from the inner core. The specific scintillating material disclosed is a glass formulation containing lithium and cesium. Brown discloses that the device may be used in the electron image detection system of U.S. Pat. No. 4,096,381. Placious et al. disclose a formulation for terbium-activated radioluminescent glass which produced a glass scintillator with excellent x-ray imaging detection characteristics.

Two studies have been published relating to the use of scintillating optical fiber arrays for x-ray imaging. Scintillating optical fiber arrays for high resolution x-ray imaging over 5 keV was disclosed by E. Bigler and F. Polack in APPLIED OPTICS; Vol. 24, No. 7; pp. 994-997; 1 Apr. 1985. Bigler et al. disclose an x-ray image detector having a 10 - 5 μm resolution for 5 keV x-rays in which the detector consists of an array of optical fibers, the core of which has been replaced by a high-index fluorescent material. In practice, the optical fibers were an array of microtubes filled with a liquid scintillator, i.e., a benzene or toluene solution of an organic fluorescent material. Other scintillating materials suggested for investigation included glasses, plastics and gels. A study of the physics of scintillating fiber optics and their applications in radiographic systems was disclosed by H. Shao, D. W. Miller and C. R. Pearsall in IEEE TRANSACTIONS ON NUCLEAR SCIENCE; Vol. 38, No. 2; pp. 845-857; April, 1991. In their study, Shao et al. used $Tb_2O_3$-based scintillating fiber optic arrays and concluded that scintillating fiber optic arrays are superior to the phosphor screen at all x-ray energies except low energy (i.e., below 90 keV).

Organic plastic scintillators have been used for scintillation counting of high energy particles and radiation and is described in Chapter 9 of THE THEORY AND PRACTICE OF SCINTILLATION COUNTING by J. B. Birks, 1964, Pergamon Press, Oxford. In particular, on pages 339 and 340, Birks reviews various attempts to incorporate compounds containing heavy elements into plastic scintillators, in order to increase γ-ray absorption coefficient, without causing too great a deterioration in scintillation efficiency due to impurity quenching. Illustrative of organic plastic scintillators which are free of heavy metal elements, are the plastic scintillators disclosed in Shimizu et al., U.S. Pat. No. 4,495,084 and the high temperature plastic scintillators of Simonetti, U.S. Pat. No. 4,713,198.

Quench-resistant fluors for liquid scintillation counting have been disclosed by S. W. Wunderly and J. M. Kauffman in APPL. RADIAT. ISOT.; Vol. 41, No. 9; pp. 809-815; 1990; INT. J. RADIAT. APPL. INSTRUM.; Part A. Wunderly et al. disclose fluors which are diaryl derivatives of fluorene or 2,2'-bifluorene and which were considered to be the most efficient fluor systems studied, particularly when chemically quenched in a non-aqueous system, or quenched with water in an emulsifier-containing system.

Radiation sensitive optical fibers and their use as detectors are disclosed in Koechner, U.S. Pat. No. 4,788,436. Koechner discloses an optical fiber sensitive to nuclear radiation which includes a thin filament core formed of a plastic scintillator material which scintillates in the presence of nuclear radiation, and an optical cladding material around the optical fiber. The specific scintillator materials disclosed by Koechner is polyvinyltoluene or polystyrene which are doped with organic scintillator material.

While scintillator plates of fiber optic arrays have improved the resolution of real-time radiographic systems, there continues to be a need to improve the efficiency of the plate in detecting x-rays, γ-rays and thermal neutrons, so as to at least equal the efficiency of screen/film systems without compromise of resolution. This need is particularly important in the area of medical diagnostics and treatment wherein exposure of the patient to high energy radiation is to be minimized. There is an additional need for a fiber optic plate with improved efficiency in exclusively detecting thermal neutrons without detecting spurious γ-rays or x-rays.

SUMMARY OF THE INVENTION

These needs are met by the scintillating optical fiber of this invention which is employed in scintillator plates and radiographic systems of this invention wherein a scintillating optical fiber comprises:
  a) an inner plastic core fiber which is transparent in at least a portion of the visible radiation spectrum and which has an index of refraction of about 1.45 or greater, the inner plastic core fiber comprising;
    1) a polymeric matrix material;
    2) a metal moiety; and
    3) an organic fluorescent material;
  b) a plastic cladding material which surrounds the inner plastic core fiber and which has an index of refraction which is less than the index of refraction of the inner plastic core fiber by a difference of about 0.1 or more.

In one embodiment of this invention, the inner plastic core fiber contains a metal moiety which emits light when excited by radiation; and in a second embodiment, the inner plastic core fiber contains a metal moiety which is taken from the group consisting of hexahydroborate, trimethylphenyl tin, and dicarbadodecarborane. In a third embodiment of this invention, the organic fluorescent material is an organic quench-resistant fluorescent material.

Another embodiment of the invention is a fiber optic scintillator plate which is a scintillator plate to convert penetrating radiation incident thereon, to visible radiation to form a photon image which comprises an array of scintillating optical fibers, the length of each fiber being substantially parallel to the path of the incident penetrating radiation, each scintillating optical fiber comprising:
  a) an inner plastic core fiber which is transparent in at least a portion of the visible radiation spectrum and which has an index of refraction of about 1.45 or greater, the inner plastic core fiber comprising;
    1) a polymeric matrix material;
    2) a metal moiety; and
    3) an organic fluorescent material;
  b) a plastic cladding material which surrounds the inner plastic core fiber and which has an index of refraction which is less than the index of refraction of the inner plastic core fiber by a difference of about 0.1 or more; and optionally
  c) an outer cladding material which is substantially opaque to visible radiation.

A further embodiment of this invention is a high resolution, high efficiency, radiographic imaging system which is a radiographic imaging system for producing an instant image of a subject, the system comprising in order:
  A) a source of penetrating radiation for traversing at least a portion of the subject;
  B) a position to locate the subject to be imaged;
  C) a scintillator plate to convert penetrating radiation incident thereon, to visible radiation to form a photon image;
  D) a charge coupled device camera to convert the photon image to a modulated electrical signal; and
  E) a monitor to convert the modulated electrical signal to a visible image or to capture the signal for data processing; wherein the scintillator plate comprises an array of scintillating optical fibers, the length of each fiber being substantially parallel to the path of the incident penetrating radiation, each scintillating optical fiber comprising:
  a) an inner plastic core fiber which is transparent in at least a portion of the visible radiation spectrum and which has an index of refraction of about 1.45 or greater, the inner plastic core fiber comprising;
    1) a polymeric matrix material;
    2) a metal moiety; and
    3) an organic fluorescent material;
  b) a plastic cladding material which surrounds the inner plastic core fiber and which has an index of refraction which is less than the index of refraction of the inner plastic core fiber by a difference of about 0.1 or more; and optionally
  c) an outer cladding material which is substantially opaque to visible radiation.

In an added embodiment of the radiographic imaging system of this invention, an image intensifier is coupled to the scintillator plate (C) to amplify the intensity of the photon image entering the charge couple device camera (D).

BRIEF DESCRIPTION OF THE DRAWINGS

The invention can be more fully understood from the following description thereof in connection with the accompanying drawings described as follows:

FIG. 2 is a view illustrating details of the fiber optic, scintillator plate of this invention.

FIG. 2A is an enlarged view of the circled portion of FIG. 2.

FIG. 3 is a schematic view illustrating the real-time, radiographic system of this invention.

FIG. 3A is an enlarged view of the circled portion of FIG. 3.

DETAILED DESCRIPTION OF THE INVENTION

The present invention relates to a novel scintillating optical fiber and its use in an array as a scintillator plate for imaging with high energy radiation, particles and the like. The scintillator plates of this invention are particularly useful in producing high efficiency and high resolution radiographic systems for x-ray medical diagnosis or non-destructive inspection as well as non-destructive inspection with thermal neutrons.

Figure 1A:
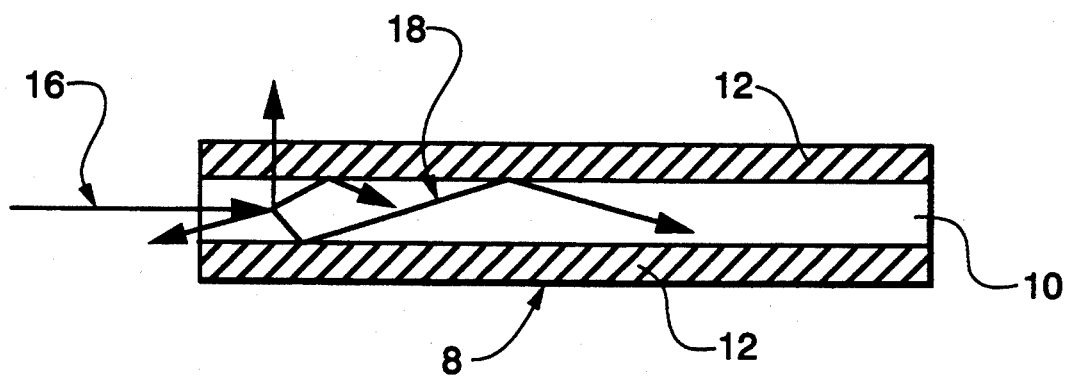
FIGS. 1a and 1b each is a sectional view illustrating details of a single scintillating, optical fiber of this invention.

Throughout the following detailed description, similar reference characters refer to similar elements in all figures of the drawings. Referring to FIG. 1A, a scintillating optical fiber (8) of this invention comprises an inner plastic core fiber (10) which is transparent in at least a portion of the visible radiation spectrum and which has an index of refraction of about 1.45 or greater and a plastic cladding material (12) which surrounds the inner plastic core fiber (10) and which has an index of refraction which is less than the index of refraction of the inner plastic core fiber (10). The inner plastic core fiber (10) comprises a polymeric matrix material; a metal moiety; and one or more organic quench-resistant fluorescent materials. In practice, penetrating radiation (16), such as electrons, protons, neutrons, x-rays, γ-rays or the like, penetrates the plastic core fiber (10) where interaction with the matrix material isotropically produces visible radiation (18). A portion of the visible radiation (18) is directed along the length of the core fiber (10) due to reflection at its interface with the plastic cladding material (12). The detection efficiency of a scintillating optical fiber (8) for penetrating radiation (16) is related to the interaction efficiency with the matrix material, the efficiency of the matrix material to produce visible light (18), the clarity and transparency of the matrix material to visible light (18) produced, and the reflection efficiency at the core-fiber/cladding interface for the visible light (18) produced.

The polymeric matrix material of the inner plastic core fiber (10) typically comprises one or more aromatic polymer(s) or copolymer(s). The aromatic polymer may be polystyrene, polyvinyltoluene, polyvinylxylene, polyvinylbiphenyl, polyvinylterphenyl, polyvinylanthracene, and the like, or mixtures thereof. The aromatic copolymer may be a copolymer of styrene, vinyltoluene, vinylxylene, a $C_2$ to $C_{20}$ alkylstyrene, divinylbenzene, or combinations thereof. Alternatively, the polymeric matrix material may comprise one or more acrylic polymer(s) or copolymer(s) having dissolved therein an aromatic compound. Preferably the acrylic polymer is poly(methyl methacrylate) and the aromatic compound is naphthalene. Typically, the polymeric matrix material will have a glass transition temperature (Tg) of about 40° C. or higher. In order to optimize the characteristics of the optical fiber core (10), e.g., Tg, index of refraction, and the like, the polymeric matrix material may contain one or more plasticizer(s). The use of plasticizers in the core fiber (10) and/or the plastic cladding material (12) to change their Tg permits the easier processing in fiber and/or scintillating plate production. The plasticizer may be any conventional organic plasticizer provided that migration between the inner plastic core fiber (10) and the plastic cladding material (12) is controlled in a way that would preserve the detection efficiency over the typical life of the scintillating optical fiber (8). Useful plasticizers of this class include, but is not intended to be limited thereby, di-butylphthalate, butyloctylphthalate, butylbenzylphthalate, di-cyclohexylphthalate, bibenzyl, napthalene and the like. Preferred are plasticizers containing aromatic character, e.g., an aromatic compound such as napthalene or pyrene, which enhances the light output of the scintillator.

The polymeric matrix material of the inner plastic core fiber (10) typically comprises one or more metal moieties which is dissolved or microscopically dispersed therein. The term "microscopically dispersed" is intended to mean a dispersion in the polymeric matrix wherein the particle size of the metal moiety is sufficiently small so as to substantially preclude light scatter within the inner plastic core fiber, e.g., a particle size of about 1 μm or less. Typically, the metal moiety is a moiety selected from the group consisting of lead, bismuth, tin, lithium six (i.e., $^6Li$), boron ten (i.e.,), $^{10}B$ indium gadolinium, and combinations thereof. Depending on its chemical and/or crystaline structure, the metal moiety may, or may not emit light when excited by radiation. Thus, the metal moiety may be a metal compound in the class known as phosphors which emit light when excited by radiation. Illustrative of such phosphors is gadolinium oxysulphide. Preferably the metal moiety is an inorganic compound or an organo-metallic compound. Illustrative of organo-metallic compounds which may be incorporated in the inner plastic core fiber (10) of this invention are: tetraethyl lead, tetrabutyl lead, tetraphenyl lead, triphenylmethyl lead, lead hexahydrobenzoate, hexahydroborate, trimethylphenyl tin, dicarbadodecarborane (also known as "carborane"), and the like. When boron containing organo-metallic compounds are used, the boron ten isotope ($^{10}B$) content therein may be enriched, e.g., the boron in dicarbadodecarborane may be about 95% by weight or greater of the boron ten isotope ($^{10}B$). The metal moiety may be chemically bonded to the polymeric matrix material. Preferably, the metal moiety chemically bonded to the polymeric matrix material is a metal salt of a polymer or copolymer containing carboxyl groups, such as, a lithium or lead salt of a polymer or copolymer of p-carboxystyrene and the like. The metal moiety also may be dispersed as a free metal or salt within the polymeric matrix material. In such polymer dispersions, the metal moiety is microscopically dispersed as defined supra. Typically, the metal moiety comprises about 1% or more of the weight of the inner plastic core fiber (10) and preferably, the metal moiety comprises between about 2% and about 15% of the weight of the inner plastic core fiber (10) in the case of organo-metallic compounds, and more than 2% of the weight of the inner plastic core fiber (10) in the case of inorganic compounds.

The polymeric matrix material of the inner plastic core fiber (10) typically comprises one or more organic fluorescent materials. The organic fluorescent material is a compound which fluoresces in at least a portion of the visible radiation spectrum. Preferably, the organic fluorescent material is an organic quench-resistant fluorescent material. For the purpose of this invention, only one organic quench-resistant fluorescent material is needed, however, the inner plastic core fiber may contain two or more of the organic quench-resistant fluorescent materials. Typically, the organic quench-resistant fluorescent material comprises about 0.1% or more of the weight of the inner plastic core fiber, and preferably, between about 0.1% and about 2.0% of the weight of the inner plastic core fiber. A particularly useful class of organic quench-resistant fluorescent materials are the oligophenylene fluors disclosed by Wunderly et al., APPL. RADIAT. ISOT.; Vol. 41, No. 9; pp. 809-815; 1990, supra, which are highly resistant to quenching by impurity atoms in the polymer matrix. Particularly preferred for use as the organic quench-resistant fluorescent material, is a compound selected from a group consisting of 2,7-diphenylfluorene, 2,7-diphenyl-9,9-dipropylfluorene, 2,7-di(p-methoxyphenyl)-9,9-dipropylfluorene, 2,7-di(t-amylphenyl)-9,9-dipropylfluorene, 2,2'-bis(7-phenyl-9,9-dipropylfluorene), 4,4''-di-t-amyl-p-terphenyl, and combinations thereof.

The scintillating optical fiber (8) of this invention contains a plastic cladding material (12) which surrounds the inner plastic core fiber. The plastic cladding material (12) has an index of refraction which is less than the index of refraction of the inner plastic core fiber (10). The plastic cladding material comprises a second polymer or copolymer which is different from the predominant polymers or copolymers employed in the core fiber (10). The second polymer or copolymer is transparent in at least a portion of the visible radiation spectrum and typically, has an index of refraction of about 1.45 or less and preferably between about 1.4 and 1.3 or less. Although the second polymer or copolymer may be selected from any polymer formulation meeting these optical criteria, a preferred class of second polymer is an amorphous fluoropolymer such as TEFLON ® AF Amorphous Fluoropolymer, a fluorocarbon resin marketed by E. I. du Pont de Nemours & Co, Wilmington, Del. Because of the inherent characteristics of amorphous polymers, TEFLON ® AF has a refractive index of 1.29–1.35 and posesses optical clarity of greater than 95% and transmission of visible light of greater than 90%. Moreover, unlike semicrystalline fluorocarbon resins, TEFLON ® AF is soluble in selected solvents having a narrow solubility range in selected perfluorinated solvents facilitating the preparation of pinhole free coatings. The plastic cladding material which surrounds the inner plastic core fiber, may contain an added metal moiety such as the metal moieties employed in the inner plastic core fiber. Typically the added metal moiety is a moiety selected from the group consisting of lead, bismuth, tin, lithium six, boron ten, indium, gadolinium, and combinations thereof.

The fraction, "F", of produced scintillation light which is directed along the length of the optical fiber core (10) may be determined by the relationship:

$$F = 0.5(1 - n_{clad}/n_{core})$$

where $n_{clad}$ and $n_{core}$ are the respective refractive indicies of the cladding and core polymers. In the practice of this invention, $n_{clad}$ is less than $n_{core}$ so that the difference between $n_{clad}$ and $n_{core}$, i.e., $n_{core} - n_{clad}$, is about 0.1 or more, and preferably 0.2 or more. The effect of cladding material on "F" is illustrated by the effect of two different cladding materials when used with a polystyrene optical fiber core for which $n_{core}$ is 1.59. When a conventional cladding material is used like polyvinylacetate which has an $n_{clad}$ of 1.44, the fraction "F" is 0.047. But when a preferred cladding material of this invention is used like TEFLON ® AF 1600 amorphous fluoropolymer which has an $n_{clad}$ of 1.31, the fraction "F" is 0.088, which is nearly double that of the conventional cladding material and thereby leads to enhanced detection efficiency of the incident penetrating radiation (16).

Detection efficiency of the scintillating optical fiber (8) (and spatial resolution of a scintillation plate made therefrom) is adversely impacted by the extent to which the isotropically produced light (18) is transmitted through the sides of the core fiber (10) as well as its leading end. In addition, extraneous light may enter the core fiber (10) and be detected along with visible light (18) produced by the penetrating radiation (16) to produce an erroneous signal.

Figure 1B:
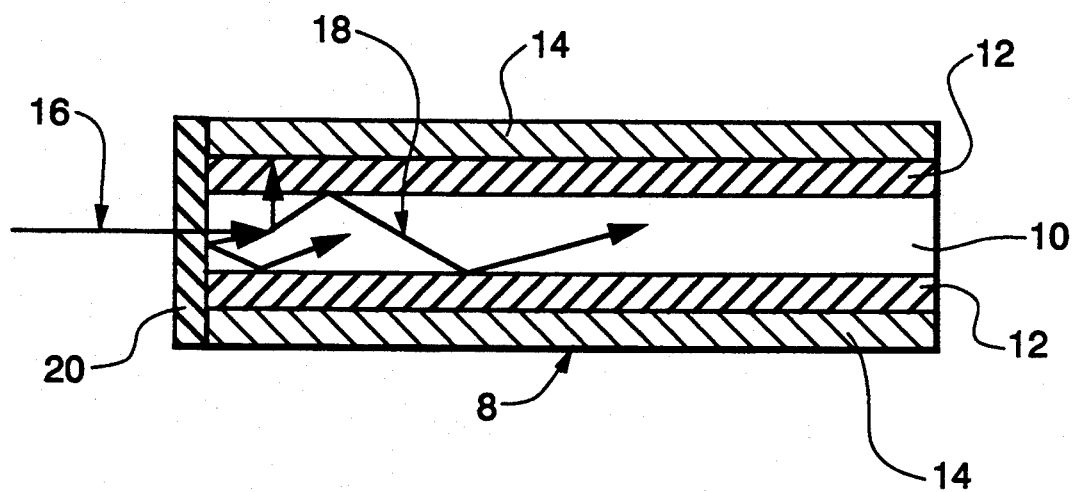

Referring to FIG. 1B, the detection efficiency of the scintillating optical fiber (8) (and spatial resolution of a scintillation plate made therefrom) may be further enhanced. In one embodiment an outer cladding material (14) surrounds the plastic cladding material (12) wherein the outer cladding material (14) is substantially opaque to visible radiation (18) thereby eliminating transmission of extraneous light into the core fiber (10). The outer cladding material (14) which surrounds the plastic cladding material (12) may be a metal, an alloy or a fusible plastic material. The outer cladding material (14) which surrounds the plastic cladding material (12) may be a metal or an alloy which is clad with a fusible plastic material. In the instance when the outer cladding material (14) is solely a fusible plastic material, the fusible plastic material typically will contain a colorant, such as a pigment, dye, or the like, in sufficient concentrations to render the outer cladding material (14) opaque to visible light.

In another embodiment illustrated in FIG. 1B, the leading end of the scintillating optical fiber (8), upon which the incident penetrating radiation (16) is incident thereon, is coated with a material (20) which is substantially reflective to the visible radiation (18) thereby substantially eliminating light loss through the incident end of the optical fiber (8). Typically, the reflective material (20) is a thin metal or alloy film of aluminum, silver, copper, gold, or the like, wherein the metal and thickness of the film is chosen to minimize interaction with the incident penetrating radiation (16).

The scintillating optical fibers (8) of this invention may be manufactured by any means typically used for producing plastic optical fibers. Thus they may be drawn from a billet of the plastic material which is previously prepared from a monomer solution of the components, from a solvent solution of the polymer and the components, or the like. Alternatively, the preformed polymer and the components may be blended in the barrel of an extruder, and the fiber extruded therefrom. The outer cladding materials may be coated on the billet prior to drawing or on the drawn or extruded fiber. Alternatively, the cladding material may be coextruded with the fiber. Methods of manufacture will be further illustrated in the examples which follow.

Scintillator plates of this invention are fiber optic arrays of the scintillating optical fibers (8) described supra. The scintillator plates of this invention have improved resolution needed for real-time radiographic systems, and, at the same time, have improved detection efficiency for x-rays, γ-rays and thermal neutrons, so as to be comparable to or better than the efficiency of conventional screen/film systems. The advances embodied by this invention are particularly significant in the area of medical diagnostics and treatment such as real-time mammography wherein patient x-ray exposure can be minimized. The advances embodied by this invention are also significant in the area of real-time non-destructive testing. The scintillator plate of this invention has improved efficiency and resolution in exclusively detecting thermal neutrons without detecting spurious γ-rays or x-rays.

Referring to FIGS. 1A, 1B, 2 and 2A, the scintillator plate (22) converts penetrating radiation (16) incident thereon, to visible radiation (18) to form a photon image. The scintillator plate (22) comprises an array of scintillating optical fibers (8), the axis of each fiber being substantially parallel to the path of the incident penetrating radiation (16). Each scintillating optical fiber (8) comprises: an inner plastic core fiber (10) which is transparent in at least a portion of the visible radiation spectrum and which has an index of refraction of about 1.45 or greater. The inner plastic core fiber (10) comprises; a polymeric matrix material; a metal moiety; and an organic quench-resistant fluorescent material described supra. A plastic cladding material (12) surrounds the inner plastic core fiber (10) and has an index of refraction which is less than the index of refraction of the inner plastic core fiber (12). Typically, an outer cladding material (14) which is substantially opaque to visible radiation, surrounds the plastic cladding material (12) of each scintillating optical fiber (8). The plastic cladding material (12) or outer cladding material (14) of each scintillating optical fiber is a fusible plastic material and wherein each scintillating optical fiber (8) of the array is fused to its neighboring scintillating optical fibers (8) by the fusible plastic material. Typically, each of the scintillating optical fibers (8) has a diameter of about 1 millimeter or less and preferably between about 1 and 0.01 millimeter. The length of the scintillating optical fibers (8) typically are between about 0.2 and about 30 millimeters. As described supra, the end of each of the scintillating optical fibers (8), upon which the incident penetrating radiation (16) is incident thereon, is substantially reflective to the visible radiation (18). The scintillator plate (22) of this invention is characterized by an image resolution of about 5 line pairs per millimeter or better and a conversion efficiency of incident penetrating radiation (16) to visible radiation (18) of about 10% or greater. The components of each scintillating optical fiber (8) of the scintillator plate array (22) is substantially as described supra.

This invention particularly relates to radiographic imaging system for producing an instant image of a subject. Referring to FIG. 3 and 3A, the radiographic imaging system comprises in order: a source (31) of penetrating radiation (16) for traversing at least a portion of the subject; a position (33) to locate the subject to be imaged; a scintillator plate (22) to convert penetrating radiation (16) incident thereon, to visible radiation (18) to form a photon image; a charge coupled device camera (26) to convert the photon image to a modulated electrical signal; and a monitor (35) to convert the modulated electrical signal to a visible image or to capture the signal for data processing. The scintillator plate (22) as described supra, comprises an array of scintillating optical fibers (8), the length of each fiber (8) being substantially parallel to the path of the incident penetrating radiation (16). Each scintillating optical fiber (8) as described supra, comprises: an inner plastic core fiber (10) which is transparent in at least a portion of the visible radiation spectrum and which has an index of refraction of about 1.45 or greater, and a plastic cladding material (12) which surrounds the inner plastic core fiber (10) and which has an index of refraction which is less than the index of refraction of the inner plastic core fiber. The inner plastic core fiber (10) as described supra, comprises; a polymeric matrix material; a metal moiety; and an organic quench-resistant fluorescent material. Although the scintillator plate (22) may be coupled directly to the charge coupled device camera (26), an image intensifier (24) may be coupled to the scintillator plate (22) to amplify the intensity of the photon image before entering the charge couple device camera (26). An image intensifier (24) is a device which takes a very low light level image, incident on its entrance face, and amplifies it and presents the final image at its output face. Similarly, the scintillator plate (22) may be coupled directly to the image intensifier (24), but, because of a mismatch of size and/or location, the scintillator plate (22) is coupled to the image intensifier (24) by an image guide (30) or a fiber optic taper (28). An image guide (30) is a coherent bundle of micro-fibers which transmit images along the guide. A fiber optic taper (28) is a specific type of image guide wherein the diameter of each of the micro-fibers is reduced along its length so that an image incident on the large diameter end of the taper is reduced in size, or demagnified, at the low diameter output end. Since the image area of the scintillator plate (22) usually is larger than the image intensifier (24) entrance face, the fiber optic taper (28) typically is used to demagnify (or minify) the image to accommodate the image intensifier. Similar accommodations can be made between the exit face of the image intensifier (24) and the charge coupled device camera (26).

The radiographic imaging system of this invention is characterized by improved image resolution along with improved detection sensitivity so that the system image resolution is about 5 line pairs per millimeter or better, and the system detection efficiency of incident penetrating radiation is about 10% or greater.

The radiographic imaging system of this invention may employ any source of penetrating radiation. Penetrating radiation includes a wide range of high energy radiation and particles. The penetrating radiation which is typically used in radiographic imaging systems comprises electrons, protons, neutrons, x-rays or $\gamma$-rays, of which x-rays and thermal neutrons are particularly preferred. The sources may be conventional or may be a pulsed source for use with digital radiography. Preferred of the pulsed sources are 20 to 80 keV x-ray generators capable of operating at greater than 10 pulses per second with a pulse duration of less than 1.0 milliseconds.

This invention will now be illustrated by the following examples but is not intended to be limited thereby.

EXAMPLE 1

A scintillating optical fiber is prepared for use in a high resolution digital mammography system.

Styrene is first treated to remove inhibitor by passing the styrene through a column. The column contains Dehibit 100 macroreticular ion exchange resin from Polysciences, Inc., Warrington, Pa. The monomer is then purified by vacuum distillation.

A glass polymerization tube having a square cross section of 4×4 cm and a length of 100 cm, is cleaned with nitric and sulfuric acids, rinsed with distilled water, and then treated for about 4 hours with a 30% solution of dimethyldichlorosilane in chloroform. The tube is then rinsed, in turn, with chloroform, methanol, and distilled water and air dried. This treatment permits easy removal of solid plastic from the tube after polymerization.

To the treated polymerization tube, is added 900 g of the purified styrene together with 45 g of triphenylmethyl lead. 13 g of 2,2'-bis(7-phenyl-9,9-dipropylfluorene) is dissolved in the styrene solution and the resulting solution is degassed by repeated freeze - vacuum - thaw cycles. The styrene solution is polymerized by immersing the tube in a silicone oil bath at 110° C. for 24 hours, and then at 125° C. for 48 hours, and finally at 140° C. for 12 hours. After removal from the oil bath, the tube is quenched in liquid nitrogen for fast release of the polymerized styrene billet.

A 1 mm×1 mm square cross-section core fiber is drawn from the billet using conventional means. The drawing is performed to achieve a certain molecular alignment in the fiber. An amorphous fluoropolymer cladding material is applied to surround the core fiber by coating sufficient layers of TEFLON ® AF 1600 amorphous fluoropolymer (having a Tg of about 160° C.) to produce a cladding thickness of about 30 μm. The cladding layers are coated from a solution of TEFLON ® AF 1600 amorphous fluoropolymer in Fluorinert ® FC-75 fluorocarbon solvent. (TEFLON ® AF 1600 and Fluorinert ® FC-75 are products of E. I. du Pont de Nemours & Co., Wilmington, Del.) The 1 mm×1 mm scintillating optical fiber produced by this process is an embodiment of the present invention that may be used to detect x-rays and other high energy radiation.

The clad 1 mm×1 mm scintillating optical fiber is further coated from a methanol solution of polyvinylacetate to provide a cladding whose thickness is about 5 μm.

A 30 mm×30 mm cross-section fiber optic bundle preform is prepared by stacking segments (about 900 mm long) of the 1 mm×1 mm scintillating optical fiber in a square cross section glass tube having a 30 mm×30 mm square cross-section. The stacked fibers are retained in place by the walls of the tube. The square tube is then placed in a vacuum oven and the temperature is gradually raised over a period of about 60 minutes to about 200° C. thereby fusing together the fibers with some expansion of the core, to form the fiber optic bundle preform. During heating, vacuum is used to avoid air bubbles and other unwanted cavities. The plastic preform is released from the glass by lowering the glass tube into liquid nitrogen. Alternatively, the fiber fusion is performed in a metal tube which is raised to about 200° C. and the contents are subjected to about 2000 pounds per square inch (~141 kgf/cm$^2$) induced by a plunger. Again, vacuum is applied to avoid air bubbles.

A 1 mm×1 mm square cross-section fiber optic bundle is drawn from the bundle preform using conventional means except that, to ensure that no entropic contraction will occur when it is processed into plate form, the fiber optic bundle is drawn from the bundle preform at a speed and temperature such as to minimize molecular orientation from the elongational velocity field. The 1.0 mm$^2$ fiber bundle produced contains about 900 scintillating optical fibers each of which has a square cross section having a core thickness of about 33 μm and an outer cladding thickness of 1.0 μm.

EXAMPLE 2

A scintillator plate is prepared for use in a high resolution digital mammography system by thermally fusing together short pieces of the fiber optic bundles of Example 1 to form a large array of the square micro-fibers.

The 1.0 mm$^2$ square fiber bundles produced in Example 1 are cut into segments about 14 mm long. The pieces are stacked endwise into a non-rectilinear, rectangular metal frame 50 mm long and 12 mm wide. When filled with the stacked pieces the walls of the frame are adjusted to clamp the pieces in place. To take account of the parallax effect the fiber axes are arranged to be parallel to the direction of the incident x-rays so that fiber bundles at the ends of the frame are oriented at about a 2.5° angle relative to the normal at the center of the frame. The frame with the clamped pieces in place, is then placed in a vacuum oven and the temperature is gradually raised over a period of about 20 minutes to 120° C. During heating, vacuum is used to avoid air bubbles and other unwanted cavities. After cooling to room temperature, the fiber bundle array is cut and polished to a nominal 10 mm thickness. A reflective surface of aluminum is then vapor deposited on the polished, incident end of the scintillator fiber plate.

The scintillating fiber plate of this example has a high quantum absorption efficiency of x-rays, averaging ≧90% over the range 20 to 30 keV while having high spatial resolution of 30 μm, corresponding to 16.7 line pairs per mm. The light output is high due to the small (<10%) quenching of the fluorescence light through the use of the designated dye.

EXAMPLE 3

A high resolution digital mammography system is prepared employing four of the scintillator plates of Example 2.

The source of penetrating radiation is an x-ray generator which is capable of operating at 15 pulses per second with a pulse duration of 0.1 milliseconds. Images are obtained between 20 and 40 keV with a focal spot of 0.15 mm in diameter. The 12 mm wide, 200 mm long scintillator plate detector formed from four plates of Example 2 is located 60 cm from the focal spot, and is mounted rigidly relative to the x-ray tube. Movement of the x-ray tube plus detector system relative to the breast is under computer control. The movement is uniform and covers a total distance of 20 cm from a position at the chest wall to beyond the nipple in a time of 1.1 seconds. Linear position control and reproducibility is better than 25 μm. Spatial resolution degradation due to relative motion of the breast during the 0.1 msec. x-ray pulse duration is limited to less than 10 μm.

The x-rays incident upon the scintillator plate detector are absorbed with high efficiency (≧90%) to produce scintillation light which is transmitted by four reformatting micro-fiber image guides to four image intensifiers. The image guides produce scrambled images at the image intensifiers because of the necessity to produce a square image at the input faces of the image intensifiers. The output faces of the image intensifiers are directly coupled to low noise charge coupled devices via fiber optic faceplates. The output of the charge coupled devices are digitized and transferred to a computer where the image is unscrambled and reconstructed using an appropriate algorithim.

Each image guide consists of bundles of 10 μm diameter glass optical fibers arranged at one end to form the rectangular shape 50 mm×12 mm to match the output face of the scintillator plate. The output of the image guide has a square cross section of 24.5 mm on edge, to match the input face of the image intensifier. Since light from the scintillator plate enters the image guide at angles up to 35.6°, there is a match of the scintillation light angle distribution with the image guide transmission acceptance angle of 41°. Attenuation of the scintillation light in the image guide is less than 5% over a distance of 20 cm.

A 40 mm first generation image intensifier (available from Delft Electronische Producten, Holland) is used, since its input face can accommodate a square image of 28.3 mm which is adequate to accept the image guide. A first generation image intensifier is one which is based on electrostatic fields to produce electron acceleration. The first generation, 40 mm image intensifier has a range of linearity of at least 2000; has superior resolution, e.g., 95 line pair/mm; tends to have long life (e.g., 20,000 hours); has a stable gain during its lifetime; and has somewhat lower noise than other similar size devices.

A conventional charge coupled device camera which is employed has the following characteristics: an input face size of 8 mm×8 mm; a pixel size of 6 μm×6 μm; an array size of 1024×1024; linearity >2000; noise (e/-pixel) ≦20; a full frame architecture; a quantum efficiency at 550 nm of >50%; and a read-out rate of 15 frames/second in this case.

During image reconstruction from the output of the charge coupled device camera, a 1024×1024 image is read out at 15 frames/second for a period of 1.1 seconds duration giving a total of 64 frames. Steps required in the data processing before displaying a final x-ray image of the breast, include:

Reconstructing the scrambled single slot image;

During the reconstruction process, correcting any non-linearity of the charge coupled device chip;

Removing from the slot image, the fixed pattern noise of the imaging system taking into consideration both pixel to pixel sensitivity and offset variations;

Removing pin-cushion distortion due to the image intensifier; and

Transferring each of the 64 slot images into the composite image which forms the mammogram.

The image reconstruction is carried out using a real time acquisition, processing, storage and display work station. A SUN SPARCstation® 10 Model 52 from Sun Microsystems Computer Corporation, San Jose, Calif., can be used for this purpose. The monitor display is a 2000×2000 color monitor. Using this system the operator has access to roam across the image and zoom in by factors of 2 or 4 in any defined region of the image.

The quantum efficiency of the system is effectively the quantum efficiency of the combination of the scintilator plate coupled with the image intensifier and the charge coupled device camera. For an x-ray quantum energy of 20 keV, the probability of producing at least one photoelectron at the input face of the image intensifier for each x-ray quantum incident on the scintillator plate is 82% or more. By careful matching of the shape of the scintillator light emission spectrum to the wavelength response of the image intensifier cathode, the quantum efficiency can be improved. Poisson statistics of the system indicates that the probability for at least one photoelectron being produced per interacting x-ray, can be as high as 97%. The gain of the image intensifier is greater than 100 so that, for each incident photoelectron generated, at least 100 photons are created at the exit face of the image intensifier and arrive at the charge coupled device camera. The charge coupled device camera having a quantum efficiency of 50%, generates at least 50 photoelectrons per x-ray incident on the scintillator plate. In this way, the typical x-ray generates a signal considerably in excess of the noise in the system.

EXAMPLE 4

A prototype imager of the mammography system of Example 3 is constructed to determine resolution limits. A square 25 mm×25 mm×1 cm thick scintillator plate composed of 562,000 micro-fibers, each 30 μm in diameter, is prepared substantially as described in Example 2. The area of the plate is approximately equal to that of the slot scintillator plate of Example 3. The plate is coupled to a tapered (1.5:1) glass micro-fiber (6 μm diameter) image guide which is connected to a Burle Industries, Inc. type S81035E11A image intensifier. A Burle Industries, Inc. type TC301E charge coupled device sensor is used to read out the intensified image. A Data Translation, Inc., type DT2322 frame grabber for a Macintosh Computer is used to obtain images for subsequent analysis.

The edge response function for this system is measured for a 0.05 mm thick lead plate. The modulation transfer function of the system is then obtained from the Fourier transform of the line spread function which is calculated from the edge response function. The limiting resolution for this prototype system is found to be about 10 line pairs/mm.

The system resolution is a result of convoluting the following individual resolutions:

| Scintillator plate | 16.7 line pairs/mm, |
| Tapered image guide | 83 line pairs/mm, |
| Image intensifier | 75 line pairs/mm, |
| Charge coupled device | 25 line pairs/mm. |

The limiting system resolution is controlled by the scintillator plate and the charge coupled device whose 25 line pairs/mm is divided by 1.5 (due to the taper) when transforming back to the scintillator plate.

The system resolution for the mammography system of Example 3 is similarly determined wherein the individual resolutions are as follows:

| Scintillator plate | 16.7 line pairs/mm, |
| Image guide | 50 line pairs/mm, |
| Image intensifier | 95 line pairs/mm, |
| Charge coupled device(6 μm pixel) | 84 line pairs/mm. |

The limiting system resolution is determined by the scintillating plate (16.7 line pairs/mm) and the charge coupled device (84 line pairs/mm divided by 4 to give 21 line pairs/mm due to minification in the image intensifier). Consequently the system resolution of the mammography system of Example 3 is about 12 line pairs/mm.

EXAMPLE 5

A real-time thermal neutron imaging system, employing a scintillator plate of this invention, is constructed for use in non-destruction examination, such as, inspection of major aircraft components (wings, jet engines, and the like).

A 1.0 mm² scintillating optical fiber bundle is produced as described in Example 1 containing about 900 scintillating optical fibers each of which has a square cross section having a core thickness of about 30 μm and an outer cladding thickness of 1 μm with the exception that the 1 mm×1 mm square cross-section core fiber is prepared by the following process.

A polymeric matrix material containing lithium-6 ($^6$Li) is synthesized by polymerization of p-carboxystyrene monomer and then reacting the polymer formed with lithium-6 hydride ($^6$LiH). In this process p-carboxystyrene is polymerized by bulk thermal polymerization. 5% by weight of lithium-6 hydride ($^6$LiH) is dissolved in the reaction mixture and reacted with the carboxy group to form lithiated poly-p-carboxystyrene. Granules of this polymer are added to the hopper of an extruder along with 1% by weight of the quench resistant dye 2,7-di(p-methoxyphenyl)-9,9-dipropyl-fluorene. The mixture is blended in the barrel of the extruder and the resulting polymeric solution is extruded into a 1 mm square scintillating fiber core. This square fiber core is then clad in the same way as described in Example 1 supra.

A scintillator plate, i.e., neutron converter plate, is prepared from the scintillating optical fiber bundles as described in Example 2 except that the dimensions of the finished plate are 30 cm×30 cm square×0.5 cm thick and the microfibers are 30 μm in diameter. This neutron converter plate has a neutron detection efficiency of 90% for thermal neutrons (0.01 eV- ≦E≦0.025 eV) and a resolution of 5 line pairs/mm, while being immune to γ-rays which may accompany the neutrons.

The source of thermal neutrons is an accelerator which provides a $10^6$ neutrons/cm$^2$/sec. thermal flux, length/diameter ratio of 25, with a 30 cm × 30 cm image size. The accelerator is portable and can be used in a turn key operation in fixed alignment with the neutron converter plate.

The neutron converter plate is coupled to an assembly of 4 ganged image intensifier/charge coupled device modules, so that the output of each 15 cm × 15 cm quadrant of the converter plate is coupled by a tapered (5:1) fiber optic image guide to the input face of an image intensifier. Each of the four image intensifier/charge coupled device modules, are substantially the same as described in Example 3.

The quantum efficiency of the system is that 1960 photoelectrons are generated from each charge coupled device per neutron incident on the converter plate with an attendant noise of about 67 electrons. The overall signal to noise ratio when a single neutron is detected is about 30:1.

Although the system spatial resolution is determined by contributions from the converter plate, the tapered fiber optics, the image intensifier and the charge coupled device, the major limiting component is the converter plate. Due to the relatively long stopping range of the charged particles produced by the incident neutron, the converter plate limits the system spatial resolution, so that a generated s-particle which generates more than half of the scintillation light, has a range which is comparable to the size of the scintillating fiber core. Consequently, a converter plate which has a 30 μm scintillating fiber core, has at least a spatial resolution of 5 line pairs/mm.

EXAMPLE 6

A scintillating optical fiber is prepared in a manner altogether similar to Example 1 except that it contains 130 g. of trimethylphenyl tin in place of the triphenylmethyl lead. In addition to the fluorescent dye of Example 1, the fiber formulation also contains 100 g. of napthalene. The tin compound enhances absorption of 20 KeV X-rays and napthalene enhances light output of the scintillating fiber.

EXAMPLE 7

A real-time thermal neutron imaging system is constructed using scintillating optical fiber bundles which are produced as described in Example 1 except that the styrene monomer was made to contain 13% by weight of dicarbadodecarborane. The boron in the dicarbadodecarborane is 97% by weight of boron ten isotope ($^{10}$B).

A scintillator plate, i.e., neutron converter plate, is prepared from the fiber bundles and employed as described in Example 5 except that the plate is directly connected to charge coupled devices via fiber optic tapers. This plate has a detection efficiency in excess of 95% for thermal neutrons.

EXAMPLE 8

A real-time thermal neutron imaging system is constructed as described in Example 7 except that a 1 mm thick solid plastic scintillator plate is employed which does not contain fibers. In this instance, the solid plastic plate is prepared from the scintillator formulation of Example 7 and contains 15% by weight of dicarbadodecarborane composed of 97% enriched boron ten ($^{10}$B). This plate is coupled either directly or via a fiber optic taper, to a position sensitive photomultiplier (such as a model Hamamatsu R2486). Using this system, a high counting rate ($\geq 10^6$/second) with a moderate spatial resolution ($\approx 1$ mm) neutron imaging can be realized.

Example 8 demonstrates an embodiment of this invention wherein a solid plastic scintillator comprises: a polymeric matrix material comprising one or more aromatic polymer(s) or copolymer(s); a metal moiety which is dicarbadodecarborane; and an organic fluorescent material. Optionally, the organic fluorescent material is an organic quench-resistant fluorescent material.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A scintillating optical fiber comprising:
   a) an inner plastic core fiber which is transparent in at least a portion of the visible radiation spectrum and which has an index of refraction of about 1.45 or greater, the inner plastic core fiber comprising;
      1) a polymeric matrix material;
      2) a metal moiety which emits light when excited by radiation; and
      3) an organic fluorescent material;
   b) a plastic cladding material which surrounds the inner plastic core fiber and which has an index of refraction which is less than the index of refraction of the inner plastic core fiber by a difference of about 0.1 or more.

2. The scintillating optical fiber of claim 1 wherein the metal moiety is a phosphor.

3. The scintillating optical fiber of claim 2 wherein the phosphor is gadolinium oxysulphide.

4. The scintillating optical fiber of claim 1 wherein the metal moiety comprises about 1% or more of the weight of the inner plastic core fiber.

5. The scintillating optical fiber of claim 1 wherein the inner plastic core fiber further comprises a second metal moiety which does not emit light when excited by radiation.

6. The scintillating optical fiber of claim 5 wherein the second metal moiety is a moiety selected from the group consisting of lead, bismuth, tin, lithium six, boron ten, indium, gadolinium, and combinations thereof.

7. The scintillating optical fiber of claim 6 wherein the second metal moiety is tetraethyl lead, tetrabutyl lead, tetraphenyl lead, triphenylmethyl lead, lead hexahydrobenzoate, hexahydroborate, trimethylphenyl tin, dicarbadodecarborane, or combinations thereof.

8. The scintillating optical fiber of claim 1 wherein the polymeric matrix material comprises one or more aromatic polymer(s) or copolymer(s).

9. The scintillating optical fiber of claim 8 wherein the aromatic polymer is polystyrene, polyvinyltoluene, polyvinylxylene, polyvinylbiphenyl, polyvinylterphenyl or polyvinylanthracene.

10. The scintillating optical fiber of claim 8 wherein the polymeric matrix material is a copolymer of styrene, vinyltoluene, vinylxylene, a $C_2$ to $C_{20}$ alkyl-styrene, divinylbenzene, or combinations thereof.

11. The scintillating optical fiber of claim 1 wherein the polymeric matrix material contains a plasticizer which is an aromatic compound.

12. The scintillating optical fiber of claim 11 wherein the aromatic compound is napthalene or pyrene.

13. The scintillating optical fiber of claim 1 wherein the organic fluorescent material is a compound which fluoresces in at least a portion of the visible radiation spectrum.

14. The scintillating optical fiber of claim 1 wherein the organic fluorescent material is an organic quench-resistant fluorescent material.

15. The scintillating optical fiber of claim 14 wherein the organic quench-resistant fluorescent material is a compound selected from a group consisting of 2,7-diphenylfluorene, 2,7-diphenyl-9,9-dipropylfluorene, 2,7-di(p-methoxyphenyl)-9,9-dipropylfluorene, 2,7-di(t-amylphenyl)-9,9-dipropylfluorene, 2,2'-bis(7-phenyl-9,9-dipropylfluorene), 4,4''-di-t-amyl-p-terphenyl, and combinations thereof.

16. The scintillating optical fiber of claim 1 wherein the plastic cladding material which surrounds the inner plastic core fiber, comprises an amorphous fluoropolymer.

17. The scintillating optical fiber of claim 1 wherein the plastic cladding material which surrounds the inner plastic core fiber, has an index of refraction which is less than the index of refraction of the inner plastic core fiber by a difference of about 0.2 or more.

18. The scintillating optical fiber of claim 1 wherein the plastic cladding material which surrounds the inner plastic core fiber, contains an added metal moiety which is a moiety selected from the group consisting of lead, bismuth, tin, lithium six, boron ten, indium, gadolinium, and combinations thereof.

19. The scintillating optical fiber of claim 1 wherein an outer cladding material surrounds the plastic cladding material and wherein the outer cladding material is substantially opaque to visible radiation.

20. The scintillating optical fiber of claim 19 wherein the outer cladding material which surrounds the plastic cladding material is a metal or an alloy.

21. The scintillating optical fiber of claim 19 wherein the outer cladding material which surrounds the plastic cladding material is a fusible plastic material.

22. A scintillating optical fiber comprising:
a) an inner plastic core fiber which is transparent in at least a portion of the visible radiation spectrum and which has an index of refraction of about 1.45 or greater, the inner plastic core fiber comprising;
 1) a polymeric matrix material;
 2) a metal moiety which is taken from the group consisting of hexahydroborate, trimethylphenyl tin, and dicarbadodecarborane; and
 3) an organic fluorescent material;
b) a plastic cladding material which surrounds the inner plastic core fiber and which has an index of refraction which is less than the index of refraction of the inner plastic core fiber by a difference of about 0.1 or more.

23. The scintillating optical fiber of claim 22 wherein the metal moiety is dicarbadodecarborane.

24. The scintillating optical fiber of claim 23 wherein the dicarbadodecarborane contains about 95% by weight or greater of boron ten isotope ($^{10}B$).

25. The scintillating optical fiber of claim 22 wherein the metal moiety is trimethylphenyl tin.

26. The scintillating optical fiber of claim 22 wherein the polymeric matrix material comprises one or more aromatic polymer(s) or copolymer(s).

27. The scintillating optical fiber of claim 26 wherein the aromatic polymer is polystyrene, polyvinyltoluene, polyvinylxylene, polyvinylbiphenyl, polyvinylterphenyl or polyvinylanthracene.

28. The scintillating optical fiber of claim 26 wherein the polymeric matrix material is a copolymer of styrene, vinyltoluene, vinylxylene, a $C_2$ to $C_{20}$ alkyl-styrene, divinylbenzene, or combinations thereof.

29. The scintillating optical fiber of claim 22 wherein the polymeric matrix material contains a plasticizer which is an aromatic compound.

30. The scintillating optical fiber of claim 29 wherein the aromatic compound is napthalene or pyrene.

31. The scintillating optical fiber of claim 22 wherein the organic fluorescent material is a compound which fluoresces in at least a portion of the visible radiation spectrum.

32. The scintillating optical fiber of claim 22 wherein the organic fluorescent material is an organic quench-resistant fluorescent material.

33. The scintillating optical fiber of claim 32 wherein the organic quench-resistant fluorescent material is a compound selected from a group consisting of 2,7-diphenylfluorene, 2,7-diphenyl-9,9-dipropylfluorene, 2,7-di(p-methoxyphenyl)-9,9-dipropylfluorene, 2,7-di(t-amylphenyl)-9,9-dipropylfluorene, 2,2'-bis(7-phenyl-9,9-dipropylfluorene), 4,4''-di-t-amyl-p-terphenyl, and combinations thereof.

34. The scintillating optical fiber of claim 22 wherein the plastic cladding material which surrounds the inner plastic core fiber, comprises an amorphous fluoropolymer.

35. The scintillating optical fiber of claim 22 wherein the plastic cladding material which surrounds the inner plastic core fiber, has an index of refraction which is less than the index of refraction of the inner plastic core fiber by a difference of about 0.2 or more.

36. The scintillating optical fiber of claim 22 wherein the plastic cladding material which surrounds the inner plastic core fiber, contains an added metal moiety which is a moiety selected from the group consisting of lead, bismuth, tin, lithium six, boron ten, indium, gadolinium, and combinations thereof.

37. The scintillating optical fiber of claim 22 wherein an outer cladding material surrounds the plastic cladding material and wherein the outer cladding material is substantially opaque to visible radiation.

38. The scintillating optical fiber of claim 37 wherein the outer cladding material which surrounds the plastic cladding material is a metal or an alloy.

39. The scintillating optical fiber of claim 37 wherein the outer cladding material which surrounds the plastic cladding material is a fusible plastic material.

40. A solid plastic scintillator comprising:
 1) a polymeric matrix material comprising one or more aromatic polymer(s) or copolymer(s);
 2) a metal moiety which is dicarbadodecarborane; and
 3) an organic fluorescent material.

* * * * *